United States Patent [19]
Bakker

[11] 3,751,274
[45] Aug. 7, 1973

[54] PLASTIC ALUMINA-SILICA REFRACTORY
[75] Inventor: Wate T. Bakker, Severna Park, Md.
[73] Assignee: General Refractories, Philadelphia, Pa.
[22] Filed: Aug. 16, 1971
[21] Appl. No.: 171,880

[52] U.S. Cl. .................................................. 106/68
[51] Int. Cl. ............................................ C04b 35/14
[58] Field of Search ....................................... 106/68

[56] References Cited
UNITED STATES PATENTS
2,880,098   3/1959   Jones .................................. 106/68

Primary Examiner—James E. Poer
Attorney—Everett H. Murray, Jr., Francis D. Neruda et al.

[57] ABSTRACT

A plastic refractory composition containing from about 45 to about 50 percent calcined Kaolin, from about 20 to about 40 percent silica and from about 10 to about 25 percent plastic clay, wherein the composition has a low alkali content, has been discovered to possess a greater volume stability and refractoriness under load than conventional refractories presently in use in high temperature furnaces.

7 Claims, 1 Drawing Figure

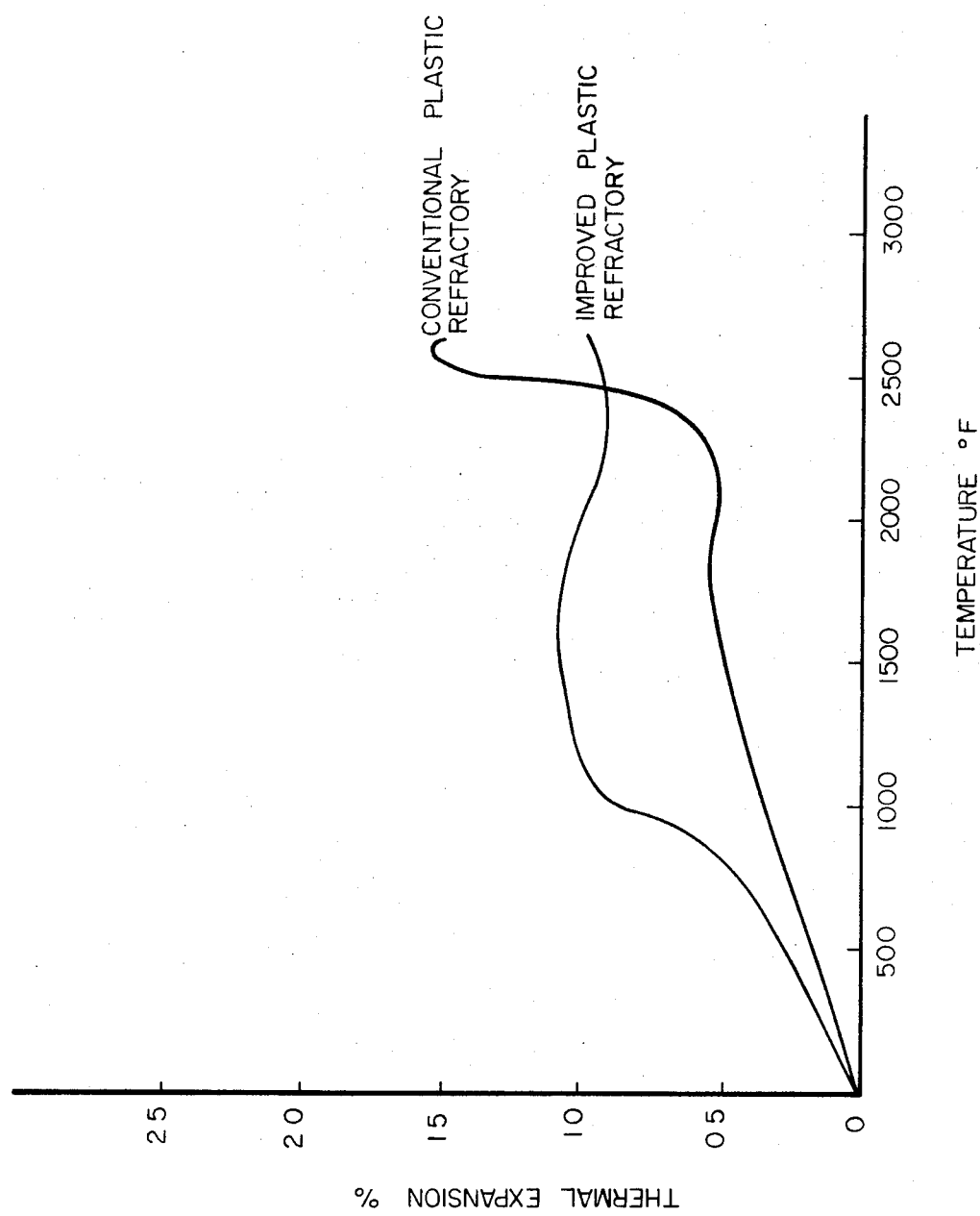

PLASTIC ALUMINA-SILICA REFRACTORY

It is the purpose of this invention to provide an improved plastic refractory composition for use at intermediate surface temperatures of from about 2,000° to about 2,750° F. which is particularly suited for applications in soaking pits for steel ingots, reheat furnaces for steel billets and the like. Furthermore, a low cost alumina-silica refractory composition is provided which possesses an excellent volume stability at from about 1,000° to about 2,750° F. and a relatively low deformation under load at steel reheating temperatures.

The use of plastic alumina-silica refractories has become widely accepted, especially in steel reheating furnaces, such as soaking pits, which operate at a temperature range of from about 2,000° to about 2,500° F. Plastic refractories have replaced brick in these applications because of their ease of installation, the ability to construct monolithic walls, and the ability to anchor a plastic refractory wall securely to a supporting steel shell of a furnace. This, of course, reduces installation costs, joint erosion is eliminated, and the occurrence of wall bulging and wall collapse is greatly decreased.

A plastic refractory to be used in high heat furnaces such as soaking pits should have good volume stability and a low deformation under load. Generally, a small amount of permanent expansion at furnace operating temperatures is not detrimental to furnace construction and may even be beneficial since, as a result, the monolithic wall structure is considerably tightened. However, the refractory should not shrink since in large installations this will cause cracking of the monolithic wall structure and premature failure of the furnace.

The conventional plastic refractories used in furnaces such as soaking pits consists of a calcined kaolin or calcined flint grog bonded with a raw plastic clay. Raw kyanite is added to this mixture to prevent excessive shrinkage at elevated temperatures. The kyanite decomposes at about 2,500° F. to mullite and a siliceous glass which results in an expansion in the range of 15 to 20 percent. The expansion of the kyanite in the product offsets the shrinkage simultaneously occurring in the raw clay matrix and results in a relatively volume-stable product. However, in practice, the disadvantage remains in that the decomposition of the raw kyanite only occurs at about 2,500° F., that is, slightly above the operating temperature of, for example, a soaking pit furnace, while shrinkage begins to occur about 1,800° F. upwards. In addition to this permanent shrinkage which occurs in the temperature range of about 2,200° to about 2,450° F., a drying shrinkage must be added which gives a total shrinkage in the neighborhood of one percent.

Furthermore, the deformation under load of conventional plastic refractories is relatively high as evidenced by the fact that at 2,460° F. it is about 2.5-3.0 percent and increasing the temperature an additional 200° results in a doubling of the deformation under load, bringing it up to 5-7 percent. It should also be noted that the addition of raw kyanite is unfavorable from an economic standpoint since its cost is about three times that of the other ingredients in the refractory composition.

It is an object of this invention to provide an improved plastic refractory for use at intermediate surface temperatures up to about 2,750° F. which is suitable for use in steel reheating furnaces.

Another object of this invention is to provide a low cost alumina-silica refractory having excellent volume stability in a temperature range of about 1,000° to about 2,700° F.

A further object of this invention is to provide a low-cost alumina-silica refractory which possesses a relatively low deformation under load at steel reheating temperatures.

Yet another object is to provide an improved plastic refractory composition which is especially suitable for molding the form of relatively stiff, dense extruded blocks which may be placed by hand with or without air ramming in a high temperature furnace.

The FIGURE shows the change in thermal expansion with increasing temperature for conventional plastic refractories and for the improved plastic refractory of this invention.

Briefly, the instant invention provides a plastic refractory composition containing from about 45 to about 65 percent calcined kaolin; from about 20 to about 40 percent silica; and from about 10 to about 25 percent plastic refractory clay, based on the total weight of the composition. It has been found that partial substitution of the calcined kaolin and the raw kyanite in conventional fire clay refractories by relatively high purity silica produces a plastic refractory exhibiting an excellent volume stability and a relatively low deformation under load. Furthermore, this improved plastic refractory is produced at a lower cost than the conventional fire clay refractories known in the art. The composition generally possesses a relatively low concentration of alkalies which contributes to its low deformation under load.

The invention provides a plastic refractory composition for use in high heat furnaces comprising about 45 to about 65 percent calcined kaolin; from about 20 to about 40 percent silica wherein the silica is partially relatively high purity silica gravel and partially relatively high purity ground silica, wherein the ground silica is of a much finer particle size; and from about 10 to about 25 percent plastic refractory clay based on the total weight of the composition. Furthermore, the invention relates to a plastic refractory composition wherein the alkali impurities of the refractory brick composition are kept to a minimum preferably 1.0 percent or below, based on the weight of the composition. To provide a relatively high refractory capability under load, it is advantageous to reduce the amount of impurities in general, especially alkali impurities present in the raw material, to a value of 1.0 percent or under. For this reason, calcined kaolin is preferred as the coarse fraction of the refractory composition since this material generally is low in alkali content, namely 0.5 percent and below. The silica used is preferably a super duty silica or a glass sand, in either case containing less than about 0.1 percent alkali impurities. The plastic clay used in the composition as a binder and a plasticizer should also contain a minimal amount of alkali impurities. However, this consideration is balanced by the plasticity which is needed to provide a workable plastic refractory amenable to easy installation. Since raw kaolin is not sufficiently plastic, it it not recommended to use this material. Suitable type clays to be used as binder and plasticizer clays include ball clays, from Kentucky, Tennessee or Texas, having an alkali impurity content of about 0.5 to about 1.5 percent by weight. The total composition generally will have an alkali content of 1.0 and below, preferably in the neighborhood of 0.5 percent, calculated by weight.

The invention is further illustrated by the following example in which all parts and percentages are by weight unless otherwise indicated. This non-limiting example is illustrative of certain embodiments designed to teach those skilled in the art how to practice the invention and to represent the best mode contemplated for carrying out the invention.

EXAMPLES

Plastic refractories were produced having the following compositions:

| Example | I | II | III | IV |
|---|---|---|---|---|
| Calcined-Georgia Kaolin (−3+28 Mesh), % | 52.0 | 52.5 | 59.0 | 47.5 |
| High Purity Silica Gravel (−28+150 Mesh), % | 20.0 | | 18.0 | 29.5 |
| High Purity Silica Sand (−48+200 Mesh), % | | 20.0 | | |
| High Purity Ground Silica Sand (−200 Mesh), % | 10.0 | 10.0 | 5.0 | 5.0 |
| Kentucky Ball Clay, % (Air Floated) | 18.0 | 17.5 | 18.0 | 19.0 |

The above materials were tempered in a pug mill or a wet pan using about 7.5 percent water and 0.5 percent of a lignosulphonate solution as tempering liquids and extruded in an auger type extruder, with a deairing chamber operating at about 26 inch mercury pressure. The mixture was extruded into a continuous column having a cross section of 9 × 6 inches and cut into 13 ½ inch long blocks. The plastic mix may also be vibrated into dense slabs measuring 8 × 12 × 2 ½ inches. The specimens prepared were tested by repressing in a hydraulic press at 1,000 psi as prescribed by A.S.T.M. testing procedures and the following results were noted:

| Example | I | II | III | IV |
|---|---|---|---|---|
| Deformation Under Load (%) 1 ½ hr. at 2460°F | 1.5–2.0 | 1.8 | n.d. | n.d. |
| Deformation Under Load (%) 1 ½ hr. at 2640°F | 2.5–3.1 | 2.6 | 3.9 | 4.1 |
| Permanent Linear Drying Change (%) | 0.3S | 0.3S | 0.3S | 0.3S |
| Permanent Linear Drying and Firing Change (%) | | | | |
| at 2,000°F | 0.3E | n.d. | 0.1S | 0 |
| at 2,550°F | 0.4E | 0.2S | 0.1S | 0.2S |

Comparison of the above data with that given earlier for conventional plastic fire clay refractories indicates that the refractoriness under load is substantially improved, while the shrinkage of the improved product in the 2,000° − 2,550°F range has been virtually eliminated. The mix composition of Example I appears to have the best overall properties, but all compositions are an improvement compared to the prior art.

The FIGURE compares the thermal expansion curve which is the sum of the permanent and the reversible thermal expansion of the improved refractory composition disclosed here with that of a conventional plastic composition. From this graph, it can be seen that the improved composition exhibits almost complete volume stability above about 1,000°F after a rapid expansion in the 500° through 1,000°F range caused by silica phase transformations. The conventional plastic shows incipient permanent shrinkage in the 2,000° to 2,500°F range, followed by a very rapid expansion above 2,500°F when the raw kyanite begins to decompose.

The principles, preferred embodiments, and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the present invention.

What is claimed is:

1. A plastic refractory composition for use at temperatures from about 2,000° to about 2,750°F comprising:
   a. from about 50 to about 60 percent calcined kaolin having a particle size of from about −3 to about +28 mesh and wherein said kaolin has an alkali content of less than about 0.5 percent by weight;
   b. from about 25 to about 35 percent high purity silica selected from the group consisting of high purity silica gravel having a particle size of from about −28 to about +150 mesh and an alkali impurity content of less than about 0.1 percent by weight, and silica sand having a particle size of about −200 mesh and an alkali impurity content of less than about 0.1 percent by weight; and
   c. from about 15 to about 20 percent plastic refractory clay having a maximum alkali impurity content of 1.5 percent by weight and wherein said plastic refractory composition exhibits an alkali content equal to or less than about 1.0 percent.

2. The plastic refractory composition of claim 1 wherein the high purity silica is high purity silica gravel.

3. The plastic refractory composition of claim 1 wherein the high purity silica is high purity silica sand.

4. The composition of claim 1 containing:
   a. about 52 percent calcined Georgia kaolin having a particle size of from about −3 to about +28 mesh;
   b. about 20 percent of high purity silica gravel having a particle size of from about −28 to about +150 mesh; and
   c. about 10 percent high purity silica sand having a particle size of about −200 mesh; and
   d. about 18 percent Kentucky ball clay.

5. The plastic refractory composition of claim 1 wherein the plastic refractory clay is selected from the group consisting of Tennessee or Kentucky ball clays having a pyrometric cone equivalent of at least 30, and an alkali content not exceeding 1.5 percent.

6. The plastic refractory composition of claim 2 comprising:
   a. 52 percent calcined Georgia Kaolin having a particle size of from −3 to +28 mesh;
   b. 20 percent high purity silica gravel having a particle size of from −28 to +150 mesh;
   c. 10 percent high purity ground silica sand having a particle size of about −200 mesh; and
   d. 18 percent air floated Kentucky ball clay.

7. The plastic refractory composition of claim 3 comprising:
   a. 52 percent calcined Georgia Kaolin having a particle size of from −3 to +28 mesh;
   b. 20 percent high purity silica sand having a particle size of from about −48 to about +200 mesh;
   c. 10 percent high purity ground silica sand having a particle size of about −200 mesh; and
   d. 18 percent air floated Kentucky ball clay.

* * * * *